(12) United States Patent
Schloss et al.

(10) Patent No.: US 10,770,089 B2
(45) Date of Patent: Sep. 8, 2020

(54) SOUND DAMPENING AND PASS THROUGH FILTERING

(71) Applicant: Caterpillar Inc., Peoria, IL (US)

(72) Inventors: Russell Schloss, Pittsburgh, PA (US); Justin Douglas Speichinger, Kobe (JP); Carsten Thees, Akashi (JP)

(73) Assignee: Caterpillar Inc., Peoria, IL (US)

( * ) Notice: Subject to any disclaimer, the term of this patent is extended or adjusted under 35 U.S.C. 154(b) by 308 days.

(21) Appl. No.: 15/976,306

(22) Filed: May 10, 2018

(65) Prior Publication Data

US 2019/0348057 A1    Nov. 14, 2019

(51) Int. Cl.

| | |
|---|---|
| *G10L 21/0232* | (2013.01) |
| *H04R 29/00* | (2006.01) |
| *H04R 1/40* | (2006.01) |
| *E02F 9/26* | (2006.01) |
| *B62D 33/06* | (2006.01) |

(52) U.S. Cl.
CPC ...... *G10L 21/0232* (2013.01); *B62D 33/0604* (2013.01); *E02F 9/26* (2013.01); *H04R 1/403* (2013.01); *H04R 1/406* (2013.01); *H04R 29/002* (2013.01)

(58) Field of Classification Search
CPC ... G10L 21/0232; B62D 33/0604; E02F 9/26; H04R 1/403; H04R 1/406; H04R 29/002
See application file for complete search history.

(56) References Cited

U.S. PATENT DOCUMENTS

| | | | |
|---|---|---|---|
| 5,251,262 A | 10/1993 | Suzuki et al. | |
| 7,203,322 B1 | 4/2007 | Bostock | |
| 8,606,573 B2 | 12/2013 | Konchitsky | |
| 9,459,176 B2 | 10/2016 | Piety et al. | |
| 9,837,083 B1 | 12/2017 | List | |
| 2003/0230447 A1* | 12/2003 | Wulfert | B60R 11/02 180/329 |
| 2006/0282264 A1 | 12/2006 | Denny et al. | |
| 2007/0140060 A1* | 6/2007 | Gatz | G10K 11/178 367/127 |

(Continued)

FOREIGN PATENT DOCUMENTS

| | | |
|---|---|---|
| CN | 204143871 U | 2/2015 |
| KR | 20170105382 A | 9/2017 |
| WO | WO 2017145090 A2 | 8/2017 |

*Primary Examiner* — Hussein Elchanti
(74) *Attorney, Agent, or Firm* — Miller, Matthias & Hull (57) ABSTRACT

A sound monitoring system for collecting and processing an environmental noise level surrounding a work machine is disclosed. The sound monitoring system may include an acoustic sensor having a plurality of microphones arranged into a signal detection array to capture the environmental noise level and generate an acoustic output signal. Additionally, the sound monitoring system may include a controller communicably coupled to the acoustic sensor and programmed to perform a signal processing to identify a first portion and a second portion of the acoustic output signal. Furthermore, the controller may be programmed to generate a controller output signal based on the first and second portions of the output level. A speaker may be located on the work machine and communicably coupled to the controller such that the speaker receives and emits the controller output signal.

14 Claims, 5 Drawing Sheets

(56) References Cited

U.S. PATENT DOCUMENTS

| | | | |
|---|---|---|---|
| 2008/0180230 A1* | 7/2008 | Zimmermann | G08B 3/10 |
| | | | 340/384.3 |
| 2015/0137998 A1 | 5/2015 | Marti et al. | |
| 2018/0077506 A1* | 3/2018 | Wacquant | H04R 3/005 |
| 2019/0032305 A1* | 1/2019 | Hageman | E02F 3/847 |
| 2019/0385583 A1* | 12/2019 | Muggleton | G10K 11/17881 |

* cited by examiner

SOUND DAMPENING AND PASS THROUGH FILTERING

FIELD OF THE DISCLOSURE

The present disclosure relates generally to a communication system and, more particularly, relates to a sound monitoring and analysis system for detecting, filtering and reproducing sound present in and around work machines.

BACKGROUND OF THE DISCLOSURE

Work machines, such as excavators, backhoes, skid steers, dozers, front-end loaders, track type machines, on-road trucks, off-road trucks, motor graders, industrial mining equipment, and the like may be used in mining, construction, agriculture, petroleum, and other such applications. During operation, a work site environment may include increased levels of background noise associated with work machine engine noise, active work tool noise and other such noise generated by equipment in and around the work site. Furthermore, ground personnel such as spotters, laborers, technicians and the like may be present around the work site. In some cases the ground personnel work in close proximity and along with the one or more work machines. As a result, clear communication between the operator of the work machine and variety of ground personnel present is important to perform different tasks or operations and ensure safety of all personnel present in and around the work site.

Background noise present around the work site can make communication difficult between ground personnel and operators of work machines. In some cases, unassisted verbal communication between individuals is not practical because work machine operators often reside within an enclosed operator compartment which somewhat isolates them from environmental noise, including verbal communication, around the work site. Furthermore, the quality of communication between work machine operators and ground personnel using an assisted communication device (e.g., hand-held radio, cellular telephone, push-to-talk cellular communication) is poor because the device simultaneously transmits the background noise along with verbal communication. Additionally, ground personnel may often need use of their hands to perform a variety of tasks around the work site which can make use of an assisted communication device difficult. As such, the desired verbal communication is often obscured or otherwise overpowered by the background noise and the recipient fails to clearly receive and understand the intended message. As a result, it may be desirable to integrate a communication system with the work machine to directionally detect and capture sound from around the work site. Moreover, the integrated system may further process the captured sound to separate desired sound (e.g., verbal communication) from undesired sound (e.g., engine noise) such that a clear line of communication is established between the work machine operator and ground personnel.

A device for reducing noise in operator compartment of construction equipment is disclosed in Chinese Patent Application Publication No. CN 204143871 U entitled, "Active noise cancelling device of engineering machinery operating room and rock drilling machine," (the '871 publication). The noise cancelling device disclosed therein includes an acquisition device having a plurality of microphones which are configured to collect noise from outside the operator compartment. The collected noise is filtered and processed by a signal processor which outputs an inverted signal having the same frequency as the filtered collected noise. The inverted signal is amplified and output through a sound unit and used to cancel the outside noise within the operator compartment.

While arguably effective for its intended purpose, the prior art continues to need improvement in detecting, filtering and transmitting desired sound within an operator compartment.

SUMMARY OF THE DISCLOSURE

In accordance with one embodiment, a sound monitoring system for collecting and processing an environmental noise level surrounding a work machine is disclosed. The monitoring system may include an acoustic sensor including a plurality of microphones arranged into an acoustic signal detection array configured to detect and capture the environmental noise level. Moreover, the acoustic sensor may generate an acoustic sensor output signal based on the environmental noise level detected. The monitoring system may further include a controller communicably coupled to the acoustic sensor and the controller may be programmed to receive and perform a signal processing on the acoustic sensor output signal to identify a first portion of the acoustic sensor output signal and a second portion of the acoustic sensor output signal, wherein the controller is programmed to generate a controller output signal based on the first portion and the second portion of the acoustic sensor output signal. Furthermore, the monitoring system may include a speaker located on the work machine and communicably coupled to the controller, wherein the controller transmits the controller output signal to the speaker and the speaker emits the controller output signal.

In accordance with another embodiment, a work machine including a sound monitoring system for collecting and processing an environmental noise level surrounding the work machine is disclosed. The work machine may include a frame configured to support an engine of the work machine and at least one work tool that is operably coupled to the frame. The work machine may further include an acoustic sensor operably coupled to the frame and the acoustic sensor includes a plurality of microphones arranged into an acoustic signal detection array configured to detect and capture the environmental noise level. Additionally, an acoustic sensor controller may be communicably coupled to the acoustic signal detection array and the acoustic sensor controller generates an acoustic sensor output signal based on the environmental noise level captured by the signal detection array. The work machine may further include a machine controller communicably coupled to the acoustic sensor controller, the machine controller programmed to receive and perform a signal processing on the acoustic sensor output signal to identify a first portion of the acoustic sensor output signal and a second portion of the acoustic sensor output portion, wherein the machine controller is programmed to generate a machine controller output signal based on the first portion and the second portion of the acoustic sensor output signal. Additionally, the work machine may include a speaker located in the operator compartment of the work machine and communicably coupled to the machine controller, wherein the machine controller transmits the machine controller output signal to the speaker and the speaker emits the machine controller output signal within the operator compartment.

In accordance with yet another embodiment, a work method of monitoring an environmental noise level around a work site using a sound monitoring system operable coupled to a work machine is disclosed. The method may include measuring a noise level surrounding the work machine to establish the environmental noise level around the work site. The method may further include activating a machine calibration sequence programmed on a machine controller to record and analyze a sound spectrum associated with a specific work machine operation. Furthermore, the method may include activating a voice calibration sequence programmed on the machine controller to record and analyze a voice spectrum associated with a pre-defined set of verbal commands. Additionally, the method may include running a sound monitoring system calibration check programmed on the machine controller to confirm the machine calibration sequence and the voice calibration sequence are within a pre-defined calibration range. The method may further include activating the sound monitoring system to monitor and analyze the noise level surrounding the work machine during operation of the work machine.

These and other aspects and features of the present disclosure will be more readily understood upon reading the following detailed description in conjunction with the accompanying drawings.

DETAILED DESCRIPTION

Figure 1:
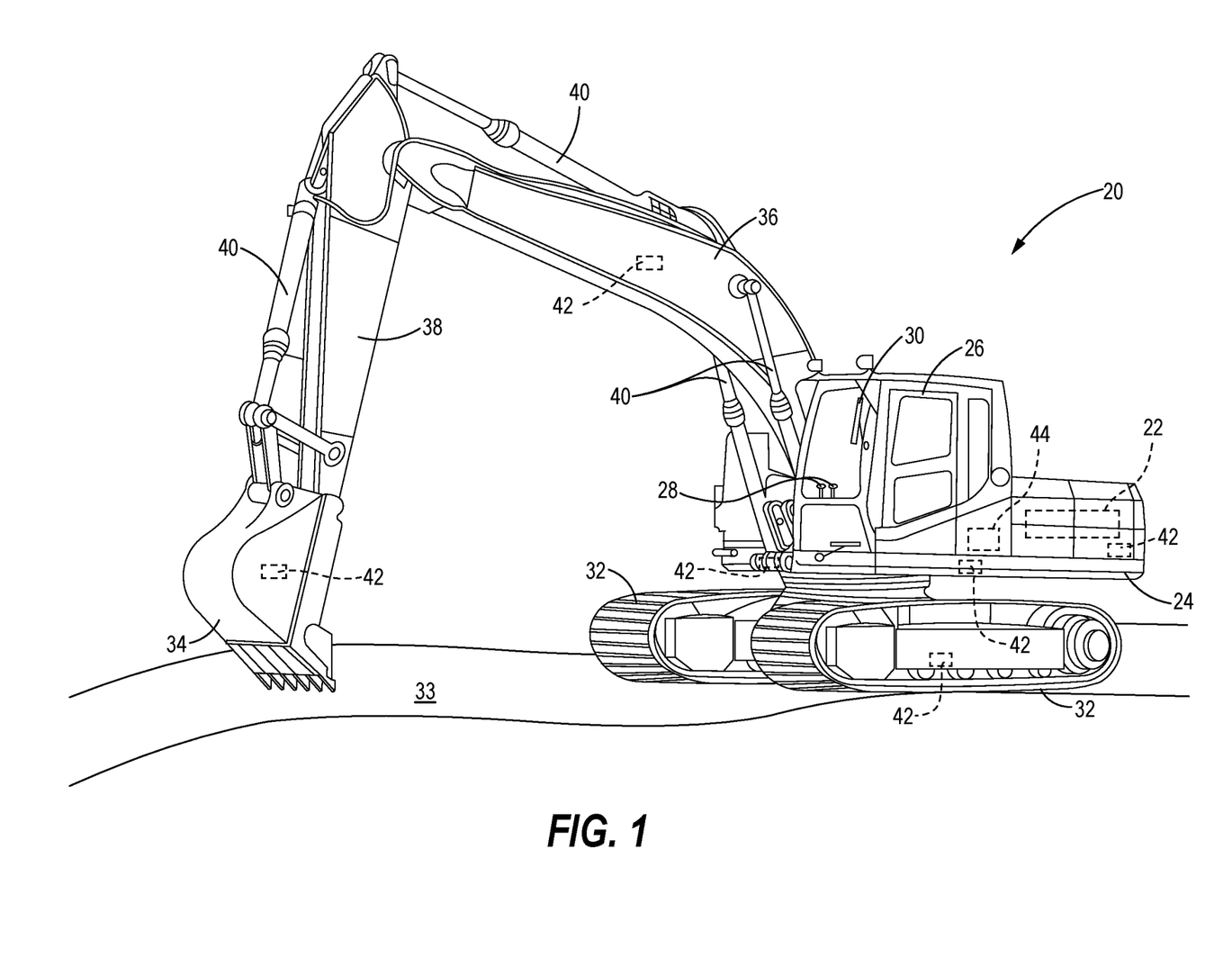
FIG. 1 is a perspective side view of an exemplary work machine, in accordance with an embodiment of the present disclosure.

Referring now to the drawings and with specific reference to FIG. 1, a work machine 20 is shown, in accordance with certain embodiments of the present disclosure. While one non-limiting example of the work machine 20 is shown as an excavator, it will be understood that the work machine 20 may include other types of machines such as but not limited to, a skid steer, a dozer, a front-end loader, a backhoe, a track-type machine, an on-road truck, an off-road truck, a motor grader, industrial mining equipment and the like. The work machine 20 may include an engine 22 configured to supply power to the machine, such as but not limited to, a diesel engine, a gasoline internal combustion engine, a natural gas engine, an electric motor, and other known power generating sources or combinations thereof. Moreover, an embodiment of the machine 20 includes a frame 24 which provides support to the engine 22, an operator compartment 26 and other such components of the work machine 20. Furthermore, the operator compartment 26 defines a fully enclosed area, or in some cases semi-enclosed, for an operator of the machine 20 to sit and/or stand in while operating the machine. 20. Additionally, the operator compartment 26 is generally configured to include a set of operational controls 28, such as but not limited to a joystick, foot pedal, lever, steering wheel and other such controls. The operational controls 28 are manipulated by the operator to control and maneuver the work machine 20. In some embodiments, the operator compartment 26 further includes one or more visual displays 30 which display or otherwise communicate information to the operator of the machine 20.

The work machine 20 further includes a set of ground engaging elements 32 operatively coupled to the frame 24. One non-limiting example of the machine 20 includes ground engaging elements 32 configured as a set of tracks; however, wheels or other such propulsion elements are possible. The ground engaging elements 32 are driven by the engine 22 to propel the work machine 20 in a direction of travel. Moreover, the ground engaging elements 32 may be operably coupled to one or more of the operational controls 28 such that the ground engaging elements 32 are actively controlled to propel and maneuver the work machine 20 around the work site 33.

Additionally, the work machine 20 may include at least one work tool 34, such as but not limited to, a bucket, drill, saw, forklift, hammer, auger, grapple, or other such tool operably attached to the frame 24 or other portion of the work machine 20. In one non-limiting example the work tool 34 is coupled to the frame 24 by a boom 36 and actuating arm 38. The boom 36 and actuating arm 38 include one or more actuation cylinders 40 that are configured to raise, lower, dig, dump, or perform another such action of the work tool 34.

Furthermore, in an embodiment, the work machine 20 includes one or more sensors 42 that are positioned in and around the work machine 20, such as but not limited to, acoustic sensors, vision sensors, accelerometers, vibration sensors, orientation sensors and the like. The sensors 42 may be configured to collect operational data, monitor machine performance, and communicate with other work machines 20 and/or personnel located around the work site 33. As such, the one or more sensors 42 can be communicably coupled to a machine control module 44 that is located within the operator compartment 26 or some other location of the work machine 20. The machine control module 44 is tasked with controlling and executing a variety of operations for a number of machine systems such as but not limited to, the hydraulic system, engine system, propulsion system, maneuvering system and the like. Furthermore, data collected by the one or more sensors 42 may be transmitted or otherwise communicated to the machine control module 44 where the data can be analyzed and used by the operator and/or machine control module 44 during operation of the work machine 20. For example, the machine control module 44 may receive data collected by the one or more sensors 42 and transmit, output signals or other such control signals to operational controls 28 of the work machine 20. Additionally or alternatively, the machine control module 44 may use data collected by the one or more sensors 42 to provide feedback, instructions, warnings or other such communication to the work machine 20 operator. It is to be understood that the work machine 20 is shown primarily for illustrative purposes to assist in disclosing features of various embodiments of the present disclosure, and that FIG. 1 may not depict all of the components of the work machine 20.

Figure 2A:
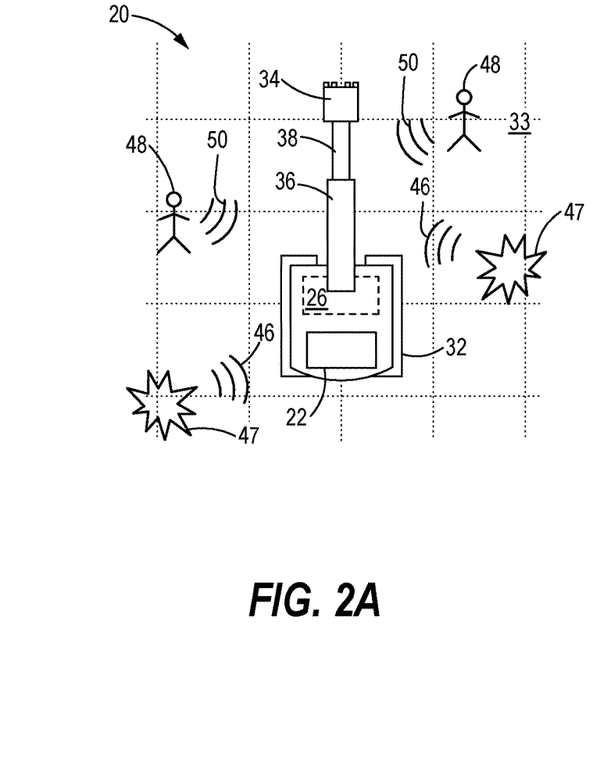
FIG. 2a is a schematic top view diagram of a work site including the work machine of FIG. 1, in accordance an embodiment of the present disclosure.

Referring now to FIG. 2a, with continued reference to FIG. 1, an exemplary schematic of the work machine 20 located at the work site 33 is illustrated. Often times, the work machine 20 is surrounded by work site noise 46 generated by a variety of work site noise sources 47. For example, the work machine 20 itself acts as a work site noise source 47 because the engine 22, the work tool 34, the ground engaging elements 32 and other machine systems and components generate a variety of noise during operation. Additionally, while only one work machine 20 is shown in FIG. 2a, it will be understood that a plurality of work machines 20 may be in operation around the work site 33 and therefore other work machines 20 may act as additional work site noise sources 47. Furthermore, work equipment (not shown), traffic, and other such noise sources may act as a work site noise source 47 and contribute to the overall level of work site noise present in and around the work site 33.

Ground personnel 48 including but not limited to, spotters, laborers, supervisors, operators, mechanics and other such individuals, may be present in and around the work site 33. In some cases, the ground personnel 48 work in close proximity to and/or alongside the work machine 20. As a result, the ground personnel 48 may need to communicate (e.g., verbally or visually) with the work machine 20 operator and vice versa. However, clear verbal communication 50 between the work machine 20 operator and the ground personnel 48 may be difficult because the operator is generally enclosed in the operator compartment 26 of the work machine 20. Moreover, the level of work site noise 46 present at the work site 33 can make verbal communication 50 between the work machine 20 operator and the ground personnel 48 difficult to hear and/or understand.

For example, if one or more ground personnel 48 issues a verbal communication 50 (e.g., speaking or yelling instructions), the work machine 20 operator may not be able to hear the ground personnel 48 due to the work site noise 46 interfering with or otherwise drowning out at least a portion of the verbal communication 50. Thus the work machine 20 operator may receive only a portion of the verbal communication 50 or miss the entire verbal communication 50 issued by ground personnel 48. Furthermore, verbal communication 50 transmitted or otherwise communicated over hand-held radio, cellular telephone or other such voice transmission communication device may be similarly difficult because the work site noise 46 can be picked up by the voice communication device and transmitted along with the verbal communication 50. As such, at least a portion of the work site noise 46 may be considered as undesired noise that interferes with and/or overpowers verbal communication 50 (i.e., desired noise) between ground personnel 48 and the work machine 20 operator and vice versa. While work site noise 46 is generally referred to as undesired noise there may be situations where the work machine 20 operator and ground personnel 48 are interested in some portion of the work site noise 46. In one non-limiting example, the sound produced by the interaction between the ground and the bucket, drill or other such work tool 34 may provide useful information to the operator and ground personnel 48. Thus, the work machine 20 operator and ground personnel 48 may consider this as desired noise included in the general work site noise 46.

Figure 2B:
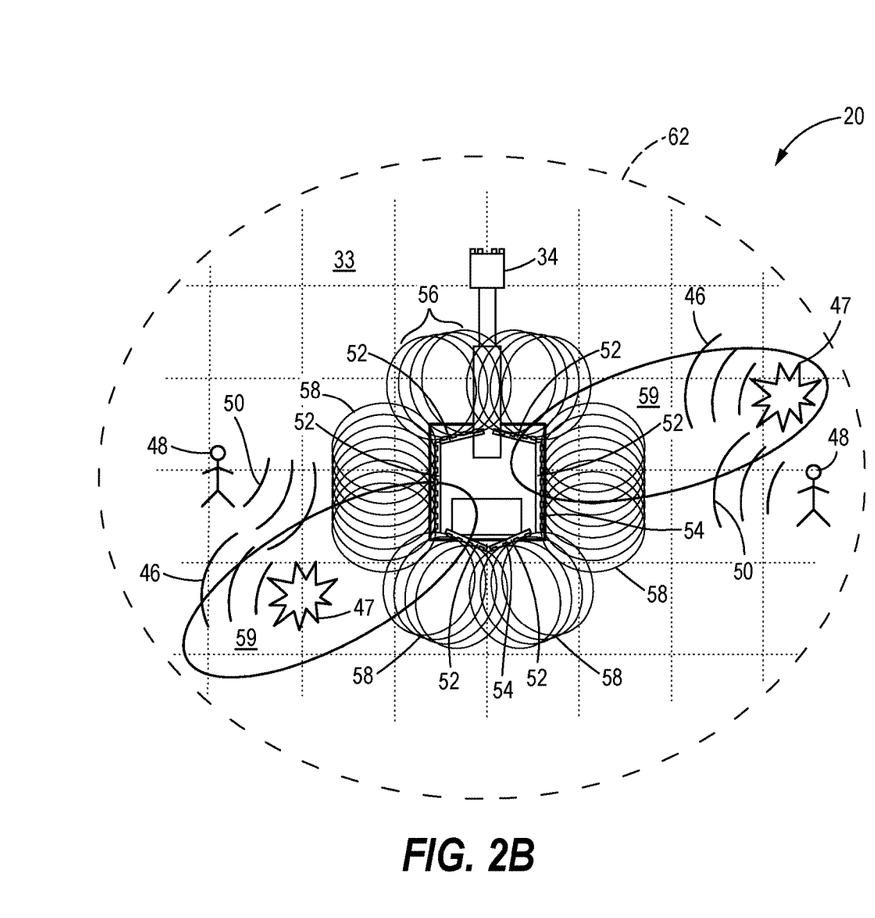
FIG. 2b is a schematic top view diagram of the work machine of FIG. 1 including a sound monitoring system for monitoring the work site, in accordance with an embodiment of the present disclosure.

Referring now to FIG. 2b with continued reference to FIGS. 1 and 2a, an exemplary work machine 20 including a plurality of acoustic sensors 52 operably coupled to the frame 24, boom 36, actuating arm 38, work tool 34 or other component of the work machine 20 is illustrated. In an embodiment, each acoustic sensor 52 includes a plurality of microphones 54 arranged to form an acoustic signal detection array 56. As one non-limiting example illustrated in FIG. 2b, each acoustic sensor 52 includes four microphones 54 defining the acoustic signal detection array 56; however fewer or greater numbers of microphones 54 are possible. Moreover, each microphone 54 of the acoustic signal detection array 56 is configured to capture an acoustic signal 58. Furthermore, the acoustic signal detection array 56 is arranged such that at least a portion of the acoustic signal 58 detected by each microphone 54 within an acoustic signal detection array 56 overlap with other microphones 54 of the acoustic signal detection array 56. Additionally, at least a portion of the acoustic signals 58 detected by one acoustic sensor detection array 56 may overlap with an adjacent acoustic signal detection array 56. As such, the acoustic signals 58 detected by each acoustic sensor 52 can be analyzed to determine a specific directional sound field 59 from which the detected work site noise 46 and/or verbal communication 50 originated from. In one non limiting example, the directional sound field 59 has a known direction and distance which may be used to identify the direction of origin a detected sound came from and the work site 33 location of the work site noise source 47.

Furthermore, in an embodiment, each acoustic sensor 52 operably coupled to the work machine 20 is communicably coupled to the machine control module 44 located in the operator compartment 26 or other such location of the work machine 20. Thus, the acoustic signal 58 or other acoustic data detected by each acoustic sensor 52 is transmitted to the machine control module 44. In some embodiments, the machine control module 44 is programmed or otherwise configured to include one or more algorithms that analyze the received acoustic signals 58 and other collected data. In one non-limiting example, the algorithm is programmed to identify, separate, filter or otherwise enhance the acoustic signal 58 detected by the microphones 54 of each acoustic signal detection array 56. As a result, the algorithm or other such control logic programmed onto the machine control module 44 may include instructions to analyze the detected noise to separate the verbal communication 50 from the work site noise 46 or other such noise detected by the acoustic signal detection arrays 56. Additionally, the algorithm or other such control logic of the machine control module 44 may be further programmed to analyze the acoustic signals 58 collected by adjacent acoustic sensors 52 to identify the directional sound field 59 containing the detected noise. As a result, the machine control module 44 may be able to determine the general direction or the specific work site 33 location where verbal communication 50 work site noise 46 contained within the detected noise originated from.

Figure 3:
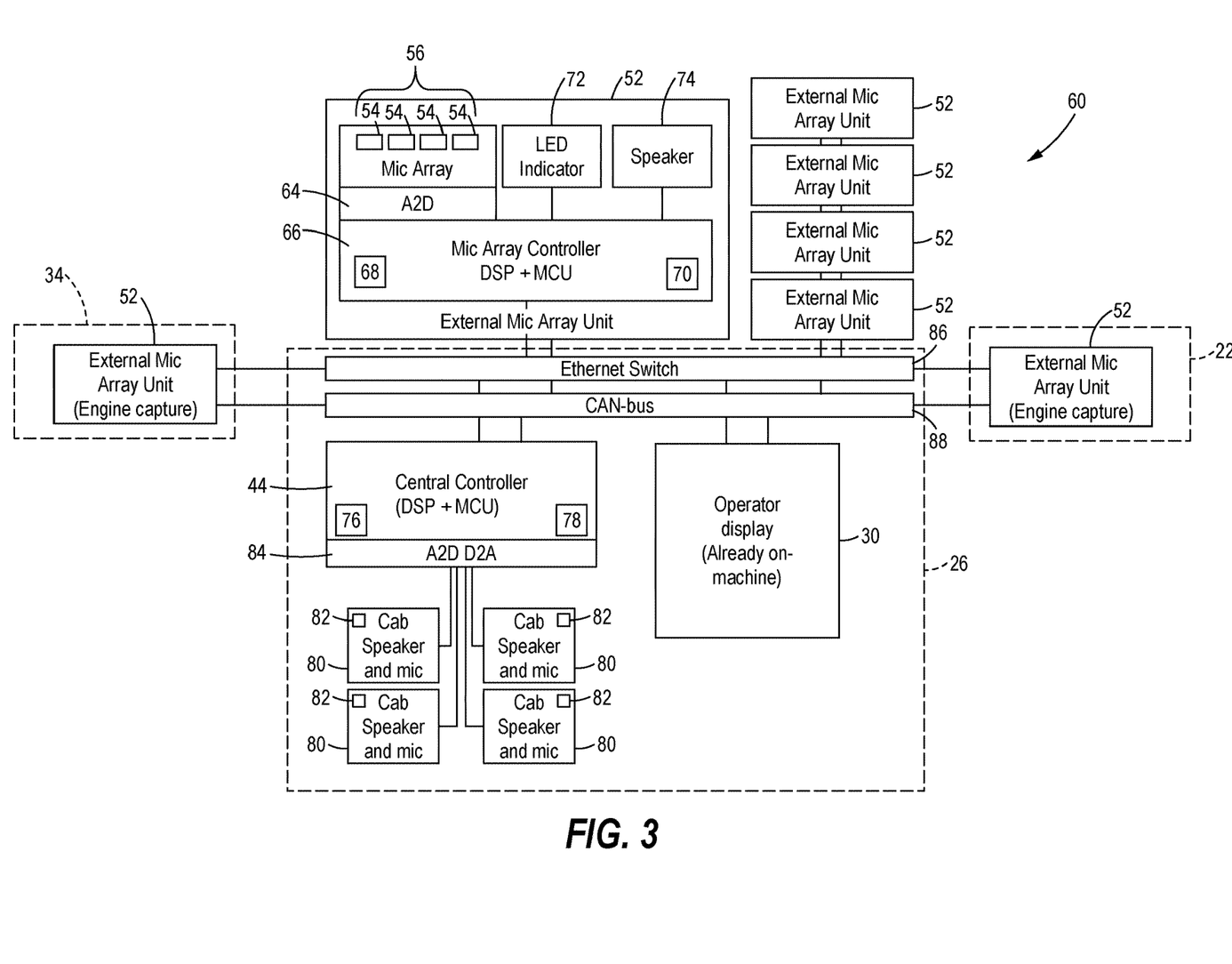
FIG. 3 is schematic diagram of a sound monitoring system for monitoring sounds around the work site, in accordance with an embodiment of the disclosure.

FIG. 3 with continued reference to FIGS. 1-2b, provides an exemplary schematic of a sound monitoring and analysis system 60 that is installed or otherwise integrated with the work machine 20. In an embodiment, the sound monitoring and analysis system 60 includes a plurality of acoustic sensors 52 positioned in and around the work machine 20. For example, one or more acoustic sensors 52 can be mounted in engine compartment or adjacent to the engine 22, on one or more work tools 34 attached to the work machine 20 and mounted on the frame 24 or other portion of the work machine 20 As discussed above with respect to FIG. 2b, each acoustic sensor 52 may be positioned on the work machine 20 such that an acoustic monitoring zone 62 is defined to surround at least a portion of the work machine 20, and each acoustic sensor 52 is configured to detect work site noise 46, verbal communication 50 and other such noises present within the acoustic monitoring zone 62. For example, as illustrated in FIG. 2*b*, the acoustic sensors 52 of the sound monitoring and analysis system 60 are arranged to define the acoustic monitoring zone 62 to completely surround (i.e., 360°) the work machine 20. However, other definitions of the acoustic monitoring zone 62 are possible. Additionally, while the schematic illustrated in FIG. 3 shows seven acoustic sensors 52 positioned around the work machine 20 it will be understood that the sound monitoring and analysis system 60 may include a greater or fewer number of acoustic sensors 52, as needed.

For simplicity, the schematic of FIG. 3 only shows one acoustic sensor 52 with the detailed illustration of individual components included in each acoustic sensor 52. However, it will be understood that each acoustic sensor 52 included in the sound monitoring and analysis system 60 will include most or all of the individual components, as discussed in more detail below. As such, each acoustic sensor 52 includes the acoustic signal detection array 56 composed of a plurality of microphones 54. In one non-limiting example, the acoustic signal detection array 56 includes four microphones 54; however fewer or greater number of microphones 54 may be used, as desired. The acoustic signal detection array 56 is coupled to an analog to digital converter (ADC) 64 which receives an analog output signal generated by the acoustic signal detection array 56 and converts the analog output signal into a digital signal. The ADC 64 is further coupled to an array controller 66 and the converted digital signal is transmitted from the ADC 64 to the array controller 66. In an embodiment, the array controller 66 is configured to control the microphones 54 and acoustic signal detection array 56 of each acoustic sensor 52 as well as perform some signal processing of the acoustic signals 58 detected by each acoustic sensor 52.

Moreover, the array controller 66 may have one or more microcontroller units 68 (MCU) which execute instructions outlined in software, programs and/or algorithms used by the array controller 66 to control the acoustic signal detection array 56. Furthermore, the array controller 66 may have one or more digital signal processors 70 (DSP) which analyze, filter, compress or perform other such operation on the digital signal which corresponds to the acoustic signal 58 detected by each microphone 54 of each acoustic signal detection array 56. In some cases, the MCU 68 and DSP 70 are semiconductor devices such as but not limited to, a field-programmable gate array (FPGA), an application-specific integrated circuit (ASIC) and the like. As such, the MCU 68 and DSP 70 may include programmable logic blocks that can be programmed to store and execute or otherwise perform a desired set of functions outlined in algorithms, software, and/or programs that are accessed by the machine control module 44. While the ADC 64 and array controller 66 are illustrated as separate components it is possible that the ADC 64, array controller 66 and other necessary components may be integrated into a single chip or electronic component.

Furthermore, sound monitoring and analysis system 60 may include one or more LED indicators 72 and one or more external speakers 74 which are used to communicate with ground personnel 48 and other individuals that are nearby the work machine 20. In an embodiment, the one or more LED indicators 72 may be configured to selectively illuminate or otherwise display at least one of a variety of colors (e.g., red, blue, green) in order to communicate a pre-determined message (e.g., warning signal, start/stop signal) or work machine 20 operational state associated with the selected color. Additionally or alternatively, the one or more LED indicators 72 may be further controlled to flash or blink at a variety of frequencies to communicate a pre-determined message or operational state of the work machine 20 associated with the specific flashing or blinking frequency. Moreover, the one or more external speakers 74 may be configured to emit a voice message or other audio signal (e.g., siren or alarm) from the operator in the operator compartment 26 to ground personnel 48 located around the work machine 20. Additionally or alternatively, the one or more external speakers 74 may to emit audio signals to communicate a pre-determined message (e.g., warning signal, start/stop signal) or work machine 20 operational state to ground personnel 48 located around the work machine 20. In one non-limiting example, at least one acoustic sensor 52 of the sound monitoring and analysis system 60 includes one LED indicator 72 and one external speaker 74 configured or otherwise arranged to communicate with the ground personnel 48 and other individuals located around the work site 33. Moreover, a plurality of acoustic sensors 52 including the LED indicator 72 and external speaker 74 may be arranged around the work machine 20 (e.g., one for each direction from work machine 20). Additionally, while FIG. 3 illustrates the LED indicator 72 and external speaker 74 being integrated with the acoustic sensor, it will be understood the LED indicator 72 and external speaker 74 may be configured as a separate component of the sound monitoring and analysis system 60.

As discussed above, each acoustic sensor 52 of the sound monitoring and analysis system 60 may be communicably coupled to the machine control module 44 located in the operator compartment 26 or other such location of the work machine 20. The machine control module 44 is generally tasked with controlling and executing a variety of operations for a number of machine systems such as but not limited to, the hydraulic system, engine system, propulsion system, maneuvering system and the like. Additionally, the machine control module 44 may serve as a centralized controller for the sound monitoring and analysis system 60, such that acoustic data (i.e., acoustic signals converted to digital signals) collected by each of the acoustic sensors is received by the machine control module 44 for further analysis, filtering, compression or other such operation. As a result, the machine control module 44 may include several algorithms or other programs that provide instructions to control and operate the sound monitoring and analysis system 60 and other machine systems.

Similar to the array controller 66 included in each acoustic sensor 52, the machine control module 44 may have one or more microcontroller units 76 (MCU) which execute the software, programs and/or algorithms used by the machine control module 44 to control various machine systems (e.g., engine control system, hydraulic system, sound monitoring and analysis system 60). Furthermore, the machine control module 44 may have one or more digital signal processors 78 (DSP) which further analyze, filter, compress or perform other such operations on the acoustic signal 58 detected by each microphone 54 and converted from an analog signal into a digital signal by the ADC 64. In some cases, the MCU 76 and DSP 78 are semiconductor devices such as but not limited to, a field-programmable gate array (FPGA), an application-specific integrated circuit (ASIC) and the like. As such, the MCU 76 and DSP 78 may include programmable logic blocks that can be programmed to execute or otherwise perform a desired set of functions outlined in the algorithms, software, and/or programs. Alternatively, it will be understood that an embodiment of the work machine 20 may include an acoustic system control module (not shown) that is separate from the machine control module 44 and the acoustic system control module (not shown) is configured to control and manage the sound monitoring and analysis system 60.

In an embodiment, the sound monitoring and analysis system 60 further includes one or more operator compartment speakers 80 that are arranged around the operator compartment 26 of the work machine 20. The operator compartment speakers 80 are communicably coupled to the machine control module 44 and configured to emit audio signals transmitted or otherwise sent from the machine control module 44. Additionally, at least one operator compartment speaker 80 may include a microphone 82 which collects audio signals detected within the operator compartment 26 and transmits them to the machine control module 44 for analysis, filtering, compression or other such function. In some embodiments, the operator may control or otherwise instruct the sound monitoring and analysis system 60 such that the one or more microphones 82 collect voice or other audio commands from the operator compartment 26 and transmits them to the one or more external speakers 74 arranged around the work machine 20. As a result, the operator is able to transmit voice commands or other such communication to ground personnel 48 working around the work machine 20.

As further illustrated in FIG. 3, the microphone 82 is incorporated with each operator compartment speaker 80; however, the microphone 82 may be a separate component positioned in the operator compartment 26 and operably coupled to other components of the sound monitoring and analysis system 60. However, independent of the location of the one or more microphones 82, an embodiment of the machine control module 44 includes an analog to digital (ADC) and digital to analog converter (DAC) 82. In general, the ADC/DAC 84 is integrated on a single chip configured to convert both analog and digital signals which are sent and received by the machine control module 44, as needed. For example, digital signals produced by the machine control module 44 can be converted into analog signals by the ADC/DAC 84 and subsequently transmitted to one or more of the operator compartment speakers 80, and/or the external speaker 74 included in the acoustic sensor 52. Conversely, analog signals generated by the microphone 82 of each operator compartment speaker 80 can be converted into digital signal by the ADC/DAC 84 and received by the machine control module 44 to be further analyzed, filtered, compressed or perform other such operation. Furthermore, while the integrated ADC/DAC 84 is illustrated in FIG. 3 as being a single chip component it will be understood that separate ADC and DAC chips may be included with the machine control module 44 for conversion of digital and analog signals.

Figure 4:
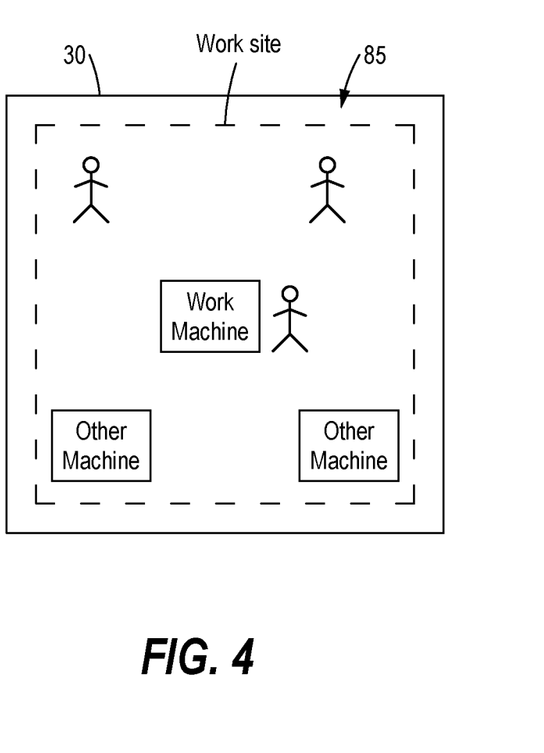
FIG. 4 is a schematic view of a work site layout displayed by a visual display of the sound and monitoring system of FIG. 3, in accordance with an embodiment of the disclosure.

The sound monitoring and analysis system 60 further incorporates the visual display 30 that is mounted in the operator compartment 26 and used by the operator during operation of the work machine 20. The visual display 30 is communicably coupled to the machine control module 44 to display data, commands or other such information which may be output by the machine control module 44. Furthermore, the operational controls 28 may include one or more input device such as but not limited to, a keyboard, mouse, dial, button, joystick, touch screen and the like. The operational controls 28 may be coupled to the visual display 30 which allows for operational commands and other instructions for the work machine 20 (FIG. 1) to be input by the operator. Additionally, as illustrated in FIG. 4, an embodiment of the sound monitoring and analysis system 60 may utilize the visual display 30 to output data, instructions, warnings or other such commands and/or information to the operator which are based on the acoustic signals 58 detected by the acoustic sensors 52 of the sound monitoring and analysis system 60. Similarly, the visual display 30 and input device (not shown) may be further used by the operator to activate, adjust, deactivate or otherwise control the sound monitoring and analysis system 60 to detect and capture sounds and noise in and around the work machine 20. Furthermore, the visual display 30 may be used to control the external speaker 74 and/or LED indicator 72 incorporated into each acoustic sensor 52 to send signals, instructions or other such communication to the ground personnel 48 working alongside the work machine 20.

In an embodiment, the sound monitoring and analysis system 60 accesses the visual display 30 to deliver information to the operator. For example, the operator or other such individual may use the visual display 30 and operational controls 28 (FIGS. 1, 5) to enter a schematic or graphical layout 85 of the work site 33 into the machine control module 44 and the graphical layout 85 displayed or viewed by the operator on the visual display 30. The machine control module 44 further includes algorithms or other programs that are capable of distinguishing between verbal communication 50 detected from ground personnel 48 and work site noise 46 detected from other work machines 20. Thus, the machine control module 44 can update the work site layout 33 to illustrate locations of detected ground personnel 48 and other work machines 20 located around the work site 33.

Alternatively and/or additionally, an embodiment of the sound monitoring and analysis system 60 includes one or more visual displays 30, and at least one visual display 30 is a mobile electronic device (not shown) such as but not limited to, a tablet computer, a smart phone, a cellular phone, a laptop computer or other such mobile device. Furthermore, the visual display 30 configured as a mobile electronic device may be communicably coupled to the machine control module 44 and displays data, control instructions, warnings or other such information which is output by the machine control module 44. Moreover, the visual display 30 configured as a mobile electronic device may include a touch screen or other input component that allows the operator to input, activate, adjust or otherwise control the sound monitoring and analysis system 60. As a result, one or more users of the sound monitoring and analysis system 60 can access the machine control module 44 using the one or more visual displays 30 and a user with a visual display 30 configured as a mobile electronic device may be remotely located from the machine control module 44 and operator compartment 26 of the work machine 20.

Such a configuration allows for the flexibility in monitoring and operating the sound monitoring and analysis system 60 during operation of the work machine 20. In one alternative embodiment, the mobile electronic device (not shown) may be used to remotely control more than just the sound monitoring and analysis system 60. For example, the operator may be positioned in a remote location (i.e., outside of the operator compartment) and able to use voice or other commands input into the hand held mobile device to control and operate the work machine 20. In yet an alternative embodiment, the acoustic sensors 52 of the sound monitoring and analysis system 60 may detect verbal instructions issued by ground personnel 48, or other individuals that are outside of the work machine 20. The machine control module 44 may receive these verbal instructions and execute one or more instructions to control and operate the work machine 20. For example, ground personnel 48 may be able to stop the work machine 20 in an emergency by issuing instructions through verbal communications 50 that are recognized by the sound monitoring and analysis system 60.

As discussed above, the acoustic sensors 52, operator compartment speakers 80, visual display 30 and other components of the sound monitoring and analysis system 60 are communicably coupled to the machine control module 44. In one non-limiting example, the work machine 20 (FIG. 1) includes one or more Ethernet switches 86 to configured to define a wired local area network (LAN) communication network which allows communication and data transfer between the components of the sound monitoring and analysis system 60 (i.e., machine control module 44, acoustic sensors 52, operator compartment speakers 80, visual display 30). Alternatively, the one or more Ethernet switches 86 may define a wireless LAN communication network using Bluetooth, near-field communication, a radio frequency network, a computer data network, a Wi-Fi data network, a cellular data network, a satellite data network or any other known wireless data communication protocol. As a result, the wireless LAN communication network may allow for wireless communication between components of the sound monitoring and analysis system 60 (i.e., machine control module 44, acoustic sensors 52, operator compartment speakers 80, visual display 30).

Additionally, the work machine 20 may include a controller area network bus 88 (CAN) as a secondary communication network configured to facilitate communication between the machine control module 44 and the acoustic sensors 52, operator compartment speakers 80 and visual display 30 and other components and systems of the work machine 20. In one non-limiting example, the sound monitoring and analysis system 60 is configured such that data is simultaneously transmitted across both the LAN communication network and CAN communication network. Accordingly, both the LAN and CAN networks are used to facilitate data communication across the sound monitoring and analysis system 60 to improve system reliability through redundancy and improving the safety of operators, ground personnel 48 and other individuals that work in close proximity to the work machine 20.

Figure 5:
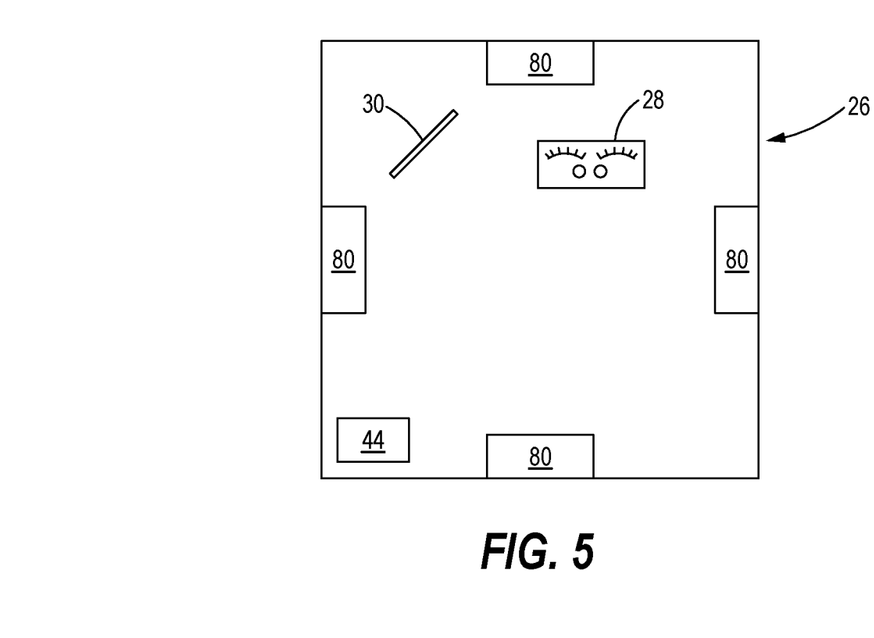
FIG. 5 is a schematic top view of an operator compartment of the work machine of FIG. 1, in accordance with an embodiment of the present disclosure.

FIG. 5 illustrates a top view schematic of an exemplary operator compartment 26 for a work machine 20 (FIG. 1) which includes the sound monitoring and analysis system 60. As discussed above, the operator compartment 26 defines an area for the operator to sit and/or stand in while operating the work machine 20. Moreover, the operator compartment 26 includes the set of operational controls 28, such as but not limited to a joystick, foot pedal, lever, steering wheel and other such controls, which are manipulated by the operator to control and maneuver the work machine 20. The operator compartment 26 further includes one or more visual displays 30 which display or otherwise communicate information to the operator of the machine 20. As described above, the visual display 30 may be communicably coupled to the machine control module 44 and operational controls 28 such that data or other information is transmitted from the machine control module 44 and displayed or otherwise communicated by the visual display 30. Additionally, the visual display 30 may be configured as a touch screen device that the operator uses to input data, send commands and/or other such instructions to the machine control module 44.

In an embodiment, the operator compartment 26 further includes the plurality of operator compartment speakers 80 which are communicably coupled to the machine control module 44 and other components of the sound monitoring and analysis system 60. In one non-limiting example, the operator compartment 26 is configured as a substantially square or rectangular space, and at least one operator compartment speaker 80 is mounted on each side of the operator compartment 26, as illustrated in FIG. 5. However, other shapes and configurations of the operator compartment 26 and a fewer or greater number of operator compartment speakers 80 arranged around the operator compartment 26 are possible. Moreover, the plurality of operator compartment speakers 80 may be further arranged in a surround sound configuration such that sound emitted from each operator compartment speaker 80 is selectively controlled to present a spatial perspective of the work site 33 location of the detected sound relative to the operator compartment 26 of the work machine 20. Put another way, the operator compartment speakers 80 may be selectively controlled to emit a sound detected behind the operator compartment 26 of the work machine 20 from the operator compartment speaker 80 positioned behind the operator. As a result, the operator may determine the source of the sound is located behind the current position of the operator compartment 26.

Accordingly, an embodiment of the sound monitoring and analysis system 60 utilizes the plurality of operator compartment speakers 80 to deliver sound within the operator compartment 26 based on the direction the sound was detected relative to the current position of the operator and the operator compartment 26 of the work machine 20. As described above with respect to FIG. 2b, to accomplish this, adjacent acoustic sensors 52 may be positioned such that the acoustic signals 58 detected by one acoustic sensor detection array 56 overlap with an adjacent acoustic signal detection array 56. As such, the acoustic signals 58 detected by each acoustic sensor 52 can be analyzed to determine the specific directional sound field 59 from which the detected work site noise 46 and/or verbal communication 50 originated from. In one non limiting example, a known direction and distance may be determined from the directional sound field 59 which can be used to identify and locate the origin of the work site noise source 47 detected within the directional sound field 59. Each acoustic sensor 52 is arranged around the work machine 20 such that the sound monitoring and analysis system 60 defines the acoustic monitoring zone 62 to completely surround (i.e., 360°) the work machine 20. Moreover, the overlapping acoustic signals 58 collected or otherwise detected by each acoustic sensor 52 can be analyzed by the array controller 66 and the machine control module 44 which may each be programmed with algorithms or other programs which analyze the detected sounds contained in the acoustic signals 58.

As a result, the machine control module 44 may be further programmed to transmit sound to one or more of the operator compartment speakers 80 based on the direction the detected sound originated from relative to the current position and orientation of the operator compartment 26 of the work machine 20. For example, a sound detected (e.g., verbal communication 50) by the sound monitoring and analysis system 60 from ground personnel 48 located to the left of the current position and orientation of the operator compartment 26 is transmitted to the operator compartment speaker 80 associated with the current left hand orientation of the operator compartment 26. Thus, the operator's ability to quickly identify and determine where the detected sound (e.g., verbal communication 50) originated from relative to the operator compartment 26 position and orientation may be improved due to the sound monitoring and analysis system 60 transmitting the detected sound through the one or more operator compartment speakers 80 associated with the work site 33 location relative to the current position and orientation of the operator compartment 26 (e.g., in front of operator compartment, behind operator compartment, to the left of operator compartment, to the right of operator compartment). While FIG. 1 illustrates the operator compartment 26 being incorporated with the work machine 20, an alternative embodiment of the sound monitoring and analysis system 60 may include the operator compartment 26 being additionally and/or alternatively located remotely from the work machine 20. As such, the set of operational controls 28 and the one or more visual displays 30 may be used to control and operate the work machine 20 from a remote location (e.g., operation center on the work site 33 and/or operation center off of work site 33). Moreover, the plurality of operator compartment speakers 80 arranged around the remotely located operator compartment 26 may provide the operator with an accurate sense of where ground personnel 48 and other work equipment is around the work site 33 relative to the work machine 20 being controlled from the remotely located operator compartment 26.

Furthermore, as previously discussed above and illustrated in FIG. 4, the sound monitoring and analysis system 60 may be configured to display or otherwise transmit information to the visual display 30. In one non-limiting example, the machine control module 44 displays a text description or other visual signal based off the analysis performed on the detected sound by the sound monitoring and analysis system 60. The text description may include the location the detected sound originated from, a voice to text conversion of verbal communication 50 included in the detected sound, and/or identification of other equipment detected and identified around the work site 33. Additionally, the machine control module 44 may issue control instructions, warning signals or other such communication to the operator of the work machine 20. Moreover, the machine control module 44 may be further programmed to automatically limit or halt the work machine 20 from carrying out an operation based on the analysis of the detected sound. For example, if the analysis performed on the detected sound determines that one or more ground personnel 48 or other work machine is in a dangerous location, the machine control module 44 may be able to override commands input by the operator of the work machine 20 as a safety precaution.

INDUSTRIAL APPLICABILITY

In general, the present disclosure may find application in many industries, including but not limited to, construction, mining, agriculture, and other such industries. In one non-limiting embodiment, the sound monitoring and analysis system 60 described above is installed on one or more work machines 20. The sound monitoring and analysis system 60 includes a plurality of acoustic sensors 52 attached around the frame 24 or other such location of the work machine 20; however the acoustic sensors 52 may be positioned in other locations as needed. Each acoustic sensor 52 includes an acoustic signal detection array 56 formed using a plurality of microphones 54. Moreover, the acoustic signal detection array 56 is configured to define an acoustic monitoring zone 62 that at least partially surrounds the work machine 20. In one non-limiting example, each acoustic signal detection array 56 is configured to monitor and detect work site noise 46 (e.g., machine noise, equipment noise, traffic noise), verbal communication 50 and other such noise present in and around the work site 33.

The sound monitoring and analysis system 60 further incorporates the machine control module 44, or other such control module that is communicably coupled to the plurality of acoustic sensors 52. The machine control module 44 includes and executes a set of algorithms and/or other such programs which analyze the acoustic signals 58 detected by each acoustic sensor 52. In one non-limiting example, the acoustic signal detection array 56 of each acoustic sensor 52 may detect overlapping portions of the acoustic signal 58 that is captured or otherwise detected by each microphone 54. As a result, the algorithms included on the machine control module 44 may be programmed to further analyze the overlapping portions of the detected acoustic signals 58 to identify the directional sound field 59 which may be used to help determine the origination direction and location of the detected sound (e.g., work site noise 46 or verbal communication 50). In some embodiments, the sound monitoring and analysis system 60 is further configured to separate multiple verbal communications 50 coming from different locations and different ground personnel 48 around the work site 33.

Furthermore, the algorithms may be programmed to filter or otherwise separate verbal communication 50 from the work site noise 46 so the operator can better hear and understand the verbal communication 50 from the ground personnel 48. Accordingly, the sound monitoring and analysis system 60 may be used to selectively attenuate, enhance, filter or perform other such audio processing on acoustic signals detected across the typical audio spectrum between 20 Hz to 20,000 Hz; however other spectrum ranges may be used. In one non-limiting example, a specified frequency range may be input into the sound monitoring and analysis system 60 in order to capture and detect verbal communication 50 and work site noise 46 that is within the specified range (e.g., telephonic frequency band 300 Hz-3400 Hz). As a result, verbal communication 50 and work site noise 46 within this specified frequency range will be transmitted to the operator or other such user and sounds outside of this specified frequency range may be filtered or otherwise removed by the sound monitoring and analysis system 60. Additionally or alternatively, other specified frequency ranges may be input to target verbal communications 50, work site noise 46 and other such sounds having a low frequency range (e.g., 60 Hz-500 Hz), a middle frequency range (e.g., 500 Hz-4000 Hz) and/or a high frequency range (e.g., 4,000 Hz and above).

Additionally, the sound monitoring and analysis system 60 includes at least one operator compartment speaker 80 positioned within the operator compartment 26 and communicably coupled to the machine control module 44. In an embodiment, a plurality of operator compartment speakers 80 may be arranged in the operator compartment 26 and controlled by the machine control module 44 in a surround sound configuration. One non-limiting example includes four operator compartment speakers 80, and each operator compartment speaker 80 is associated with a work site 33 location relative to the work machine 20 (e.g., in front of machine, behind machine, to left of machine, to right of the machine). Moreover, algorithms or other programs included on the machine control module 44 are programmed to transmit sound detected by acoustic sensors 52 to the operator compartment speakers 80 based on the determined origination location and direction of the detected sound (e.g., verbal communication 50). Put another way, verbal communication 50 detected from ground personnel 48 located behind the work machine 20 would be emitted from the operator compartment speaker 80 associated with that machine location (e.g., rear speaker in operator compartment). As a result, the surround sound control of the operator compartment speakers 80 may enhance perception of the detected sound in space by associating the sound origination point (i.e., behind the machine) with a known orientation relative to the work machine 20 operator (i.e., sound reproduced from speaker behind the operator).

Accordingly, the sound monitoring and analysis system 60 may improve communication between the work machine 20 operator and ground personnel 48 that are working in close proximity (i.e., within defined acoustic monitoring zone 62) to the work machine 20. Such improved communication may be valuable because it can help keep the operator informed of where ground personnel 48 are specifically located and whether the ground personnel 48 are in a safe location or potentially dangerous location. Additionally, the improved communication provided by the sound monitoring and analysis system 60 may increase productivity of the work machine 20 by facilitating a more efficient exchange of instructions and/or feedback between the work machine 20 operator and ground personnel 48. Moreover, the sound monitoring and analysis system 60 may help prevent unnecessary or catastrophic accidents involving the work machine 20 because the acoustic sensors 52 may be capable of picking up emergency voice commands or other instructions (e.g., "stop machine") from the ground personnel 48, or other individuals located around the work site 33, which override the operator of the work machine 20.

Figure 6:
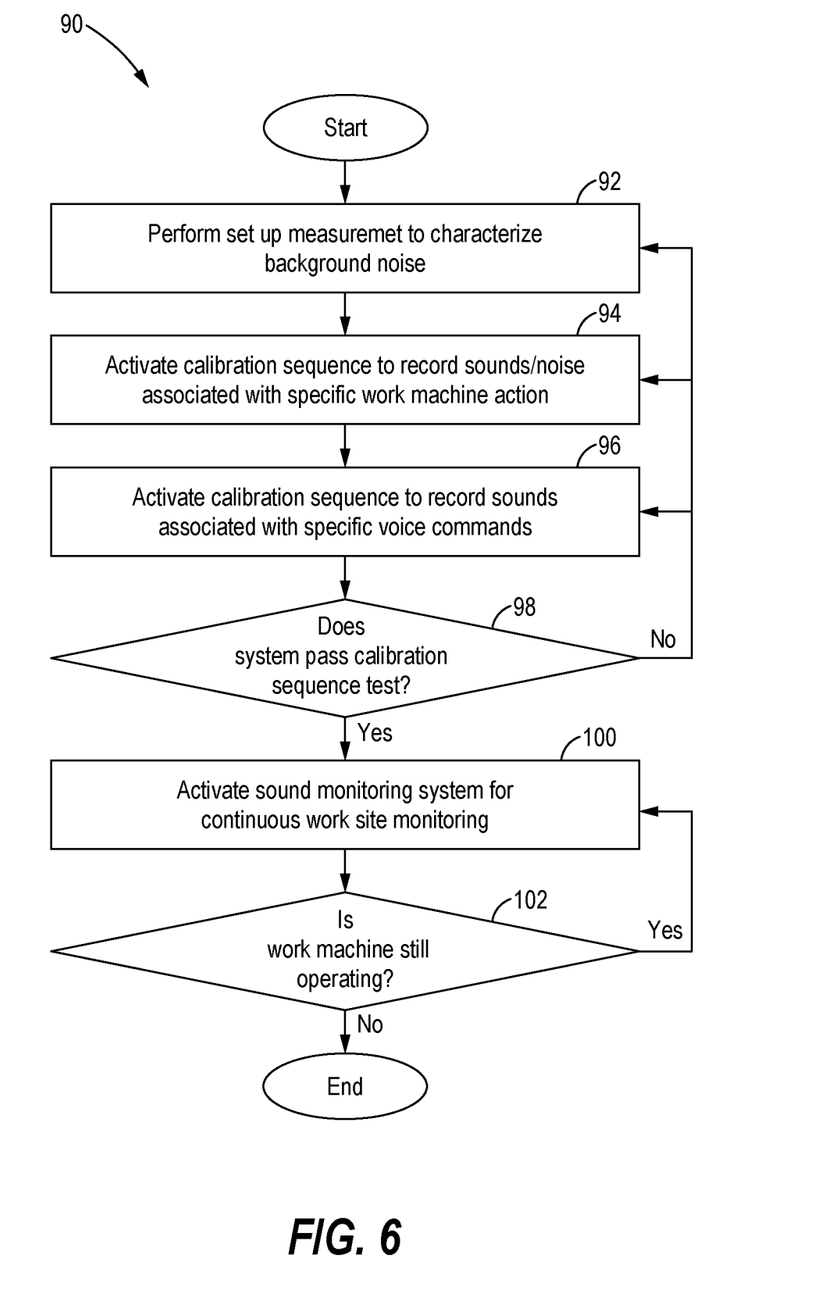
FIG. 6 is a flow chart of a method executed by the monitoring system of FIGS. 2b and 3, in accordance with an embodiment of the present disclosure.

Referring to FIG. 6, with continued reference to FIGS. 1-5, a method 90 for monitoring and analyzing noise at the work site 33 is shown. In a first block 92 of the method 90, the work machine 20 may be started or otherwise powered up. Upon starting up the work machine 20 the sound monitoring and analysis system 60 is activated and the operator may need to perform a system initialization to characterize (i.e., determine desired sound from undesired sound) the work site noise 46. Generally, the work site noise 46 includes noise from other work machines 20, equipment, traffic, and the like, which is typically present in and around the work site 33. The machine control module 44 may make a recording measurement of the initial work site noise 46 that is collected over a pre-defined time period (e.g., 1 to 5 minutes). Once completed, the algorithms stored on the machine control module 44 may analyze the initial work site noise 46 measurement and create a work site noise 46 spectrum which is a data file that is stored on the machine control module 44 and contains characteristics (e.g., frequency, loudness) of the measured work site noise 46. As such, the machine control module 44 may reference the work site noise 46 spectrum to filter, attenuate or otherwise subtract out the background noise from other data collected by the sound monitoring and analysis system 60.

Once the initial work site noise 46 measurement is completed, in a next block 94 an embodiment of the sound monitoring and analysis system 60 activates a machine calibration sequence to record a sound spectrum associated with various actions of the work machine 20. For example, as discussed above, a plurality of acoustic sensors 52 are positioned in and around the work machine 20, including at least one acoustic sensor 52 placed adjacent to the engine 22. The plurality of acoustic sensors 52 are activated to monitor and collect engine noise generated during various operational states of the work machine 20. For example, engine noise may be measured and analyzed at idle speed as well as at several different engine speeds run at pre-determined RPM levels. Furthermore, the sound monitoring and analysis system 60 may monitor noise produced by other machine components and systems, such as but not limited to the hydraulic actuating cylinders 40 (e.g., hydraulic pump stroke noise), the ground engaging elements 32 and the work tool 34. Similar to the initial work site noise 46 measurement, the acoustic and noise data collected during the machine calibration sequence may be analyzed to produce a work machine 20 sound spectrum associated with the various operational states of the work machine 20. Thus, the machine control module 44 can, additionally or alternatively, reference the calibration sequence sound spectrum to filter, attenuate, enhance, subtract or otherwise isolate the work machine 20 noise from other data collected by the sound monitoring and analysis system 60.

In a next block 96, an embodiment of the sound monitoring and analysis system 60 can be instructed to perform a verbal command calibration sequence that records, trains or otherwise validates a measured sound spectrum associated with various verbal communications 50 used around the work site 33. As discussed above, one non-limiting aspect of the sound monitoring and analysis system 60 is to monitor, capture and transmit verbal communication 50 and other desired sounds from around the work site 33 to the work machine 20 and vice versa. Furthermore, the increased environmental noise levels generally present around the work site 33 may make verbal communication 50 between the work machine 20 operator difficult and ground personnel more difficult. As such, the verbal command calibration sequence may train, teach or otherwise validate certain verbal communication 50 which include commands and other such phrases exchanged between the ground personnel 48 and work machine 20 operator. For example, one or more ground personnel 48 working nearby the work machine 20 recites a verbal command or phrase that is detected by the acoustic sensors 52. The verbal command calibration sequence performs a voice recognition sequence that is programmed to train the sound monitoring and analysis system 60 based on the detected verbal command or phrase. Thus, the voice recognition sequence can be used by the sound monitoring and analysis system 60 to recognize verbal communication 50 recited by the ground personnel 48. Additionally, the verbal command calibration sequence can be performed using verbal commands and phases recited by the operator and other individuals present in and around the work machine 20. Moreover, during operation of the sound monitoring and analysis system 60 the machine control module 44 algorithms may be further programmed to identify a verbal command sound spectrum based off the voice recognition sequence and the algorithms may use the verbal command sound spectrum to filter, attenuate, enhance, subtract and/or otherwise isolate the verbal communication 50 from the work site noise 46.

In a next block 98, the method 90 for monitoring and analyzing noise at the work site 33 performs a calibration sequence test. In an embodiment, the machine control module 44 executes a pre-defined calibration test to confirm the work site noise spectrum, work machine sound spectrum, and verbal command calibration sequence comply with pre-defined sound/voice recognition values. If the sound monitoring and analysis system 60 does not pass the calibration sequence test then the method 90 may return to blocks 92, 94 and/or 96 to start the set-up and calibration of the sound monitoring and analysis system 60.

If the sound monitoring and analysis system 60 passes the calibration sequence test performed in block 98, then in a next block 100, the work machine 20 operator may activate the sound monitoring and analysis system 60 for work site 33 monitoring. In an embodiment, the sound monitoring and analysis system 60 is selected to operate in a continuous monitoring mode where the acoustic sensors 52 actively monitor the work site 33 for sounds (e.g., verbal communication 50, work site noise 46) within the defined acoustic monitoring zone 62. Alternatively, the operator of the work machine 20 can selectively activate and deactivate the sound monitoring and analysis system 60 to monitor the work site 33 for sounds (e.g., verbal communication 50 and work site noise 46) within the defined acoustic monitoring zone 62, as desired.

In a next block 102, the sound monitoring and analysis system 60 can be instructed or otherwise controlled to enter into a sleep mode if the operator of the work machine 20 would like to temporarily pause or stop the sound monitoring and analysis system 60 during an inactive period of the work machine 20. For example, the operator of the work machine 20 may place the sound monitoring and analysis system 60 into the sleep mode during a routine break period, maintenance period or other such pause in activity around the work site 33. When the operator wants to resume monitoring the work site 33 for sounds the method 90 returns to block 100 to resume monitoring the work site 33 for sounds. Alternatively, if the work activity around the work site 33 is completed the operator of the work machine 20 can instruct the sound monitoring and analysis system 60 to shut down.

While the foregoing detailed description has been given and provided with respect to certain specific embodiments, it is to be understood that the scope of the disclosure should not be limited to such embodiments, but that the same are provided simply for enablement and best mode purposes. The breadth and spirit of the present disclosure is broader than the embodiments specifically disclosed and encompassed within the claims appended hereto. Moreover, while some features are described in conjunction with certain specific embodiments, these features are not limited to use with only the embodiment with which they are described, but instead may be used together with or separate from, other features disclosed in conjunction with alternate embodiments.

What is claimed is:

1. A sound monitoring system for collecting and processing an environmental noise level surrounding a work machine, the sound monitoring system comprising:
    an acoustic sensor including a plurality of microphones arranged into an acoustic signal detection array configured to detect and capture the environmental noise level and the acoustic sensor generates an acoustic sensor output signal based on the environmental noise level detected;
    a controller communicably coupled to the acoustic sensor, the controller programmed to receive and perform a signal processing on the acoustic sensor output signal to identify a first portion of the acoustic sensor output signal and a second portion of the acoustic sensor output signal, wherein the controller is programmed to generate a controller output signal based on the first portion and the second portion of the acoustic sensor output signal;
    a speaker located on the work machine and communicably coupled to the controller, wherein the controller transmits the controller output signal to the speaker and the speaker emits the controller output signal; and
    a plurality of acoustic sensors and each acoustic sensor of the plurality of acoustic sensors generates a unique acoustic sensor output signal, wherein the controller receives the unique acoustic sensor output signal from each acoustic sensor of the plurality of acoustic sensors, and wherein the signal processing identifies the first portion of the unique acoustic sensor output signal and the second portion of the unique acoustic sensor output signal from each of the unique acoustic sensor output signals.

2. The sound monitoring system of claim 1, wherein the acoustic sensor further includes at least one LED indicator, and wherein the controller is programmed to selectively illuminate a color of the at least one LED indicator to communicate a pre-determined message associated with the color.

3. The sound monitoring system of claim 1, wherein the acoustic sensor further includes a speaker configured to emit an audio message into an area surrounding the work machine.

4. The sound monitoring system of claim 1, wherein the first portion of the acoustic sensor output signal is identified as an undesired sound and the signal processing includes a sound dampening portion to dampen the undesired sound of the acoustic sensor output signal, wherein the second portion of the acoustic sensor output signal is identified as a desired sound and the signal processing includes an enhancing portion to enhance the desired sound of the acoustic sensor output signal, and wherein the controller is programmed to filter the undesired sound from the acoustic sensor output signal and amplify the desired sound from the acoustic sensor output signal.

5. The sound monitoring system of claim 1, wherein the desired sound of each unique acoustic sensor output signal includes an overlapping portion and wherein the controller is further programmed to analyze the overlapping portion of each unique acoustic sensor output signal to generate a directional sound field that identifies a location and a direction of origin of the desired sound relative to a location of each acoustic sensor of the plurality of acoustic sensors.

6. The sound monitoring system of claim 5, further comprising a plurality of speakers arranged on the work machine and communicably coupled to the controller, wherein the desired sound is included in the controller output signal and emitted from the plurality of speakers.

7. The sound monitoring system of claim 6, wherein the plurality of speakers are operably controlled by the controller in a surround sound configuration to emit the directional sound field such that the surround sound configuration is used to communicate the location and the direction of origin of the desired sound.

8. A work machine including a sound monitoring system for collecting and processing an environmental noise level surrounding the work machine, the work machine comprising:
    a frame configured to support an engine of the work machine and at least one work tool that is operably coupled to the frame;
    an acoustic sensor operably coupled to the frame and the acoustic sensor includes a plurality of microphones arranged into an acoustic signal detection array configured to detect and capture the environmental noise level;
    an acoustic sensor controller communicably coupled to the acoustic signal detection array, the acoustic sensor controller generates an acoustic sensor output signal based on the environmental noise level captured by the signal detection array;

a machine controller communicably coupled to the acoustic sensor controller, the machine controller programmed to receive and perform a signal processing on the acoustic sensor output signal to identify a first portion of the acoustic sensor output signal and a second portion of the acoustic sensor output signal, wherein the machine controller is programmed to generate a machine controller output signal based on the first portion and the second portion of the acoustic sensor output signal;

a speaker located in an operator compartment of the work machine and communicably coupled to the machine controller, wherein the machine controller transmits the machine controller output signal to the speaker and the speaker emits the machine controller output signal within the operator compartment; and a plurality of acoustic sensors coupled to the frame of the work machine and each acoustic sensor of the plurality of acoustic sensors generates a unique acoustic sensor output signal, wherein the machine controller receives the unique acoustic sensor output signal from each acoustic sensor of the plurality of acoustic sensors, and wherein the signal processing identifies the first portion of the unique acoustic sensor output signal and the second portion of the unique acoustic sensor output signal from each of the unique acoustic sensor output signals.

9. The work machine of claim 8, wherein the acoustic sensor further includes at least one LED indicator, and wherein the machine controller is programmed to selectively control the at least one LED indicator to illuminate a color to communicate a pre-determined message associated with the color.

10. The work machine of claim 8, wherein the acoustic sensor further includes a speaker configured to emit an audio message into an external area from the operating compartment and surrounding the work machine.

11. The work machine of claim 8, wherein the first portion of the acoustic sensor output signal is identified as an undesired sound and the signal processing includes a sound dampening portion to dampen the undesired sound of the acoustic sensor output signal, wherein the second portion of the acoustic sensor output signal is identified as a desired sound and the signal processing includes an enhancing portion to enhance the desired sound of the acoustic sensor output signal, and wherein the machine controller is programmed to filter the undesired sound from the acoustic sensor output signal and amplify the desired sound from the acoustic sensor output signal.

12. The work machine of claim 8, wherein the desired sound of each unique acoustic sensor output signal includes an overlapping portion, and wherein the machine controller is further programmed to analyze the overlapping portion of each unique acoustic sensor output signal to generate a directional sound field that identifies a location and a direction of origin of the desired sound relative to a location of the work machine.

13. The work machine of claim 12, further comprising a plurality of speakers arranged within the operator compartment and communicably coupled to the machine controller, wherein the desired sound is included in the machine controller output signal and emitted from the plurality of speakers within the operator compartment.

14. The work machine of claim 13, wherein the plurality of speakers are operably controlled by the machine controller in a surround sound configuration to emit the directional sound field such that the surround sound configuration is used to communicate the location and the direction of origin of the desired sound.

* * * * *